United States Patent [19]

Roberts

[11] Patent Number: 5,344,098

[45] Date of Patent: Sep. 6, 1994

[54] MECHANISM TO INHIBIT LATCHING OF TRIP MECHANISM ON A BAIT CAST FISHING REEL

[75] Inventor: Dennis E. Roberts, Owasso, Okla.

[73] Assignee: Zebco Corporation, Tulsa, Okla.

[21] Appl. No.: 556,844

[22] Filed: Jul. 23, 1990

[51] Int. Cl.⁵ ............................................. A01K 89/015
[52] U.S. Cl. ..................................................... 242/261
[58] Field of Search ........................ 242/260, 261, 262

[56] References Cited

U.S. PATENT DOCUMENTS

| | | | |
|---|---|---|---|
| 4,564,158 | 1/1986 | Moosberg et al. | 242/261 |
| 4,579,296 | 4/1986 | Karlsson et al. | 242/261 |
| 4,593,869 | 6/1986 | Yasui et al. | 242/261 |
| 4,798,355 | 1/1989 | Kaneko | 242/261 |
| 4,824,046 | 4/1989 | Emura et al. | 242/261 |
| 4,850,550 | 7/1989 | Aoki | 242/261 |
| 4,905,930 | 3/1990 | Puryear et al. | 242/312 |
| 4,919,360 | 4/1990 | Roberts | 242/261 |

Primary Examiner—Katherine Matecki

[57] ABSTRACT

A fishing reel having a line-carrying spool, structure for directing line onto the spool, structure for selectively placing the fishing reel in cast and retrieve modes, line control structure for allowing the line to pay freely off of the spool with the reel in its cast mode and for preventing the line from freely paying off of the spool with the reel in its retrieve mode, structure for maintaining the fishing reel in its cast mode, and structure for selectively 1) preventing the maintaining structure from maintaining the fishing reel in the cast mode with the preventing structure in an "on" position and 2) allowing the maintaining structure to maintain the fishing reel in the cast mode with the preventing structure in an "off" position.

13 Claims, 5 Drawing Sheets

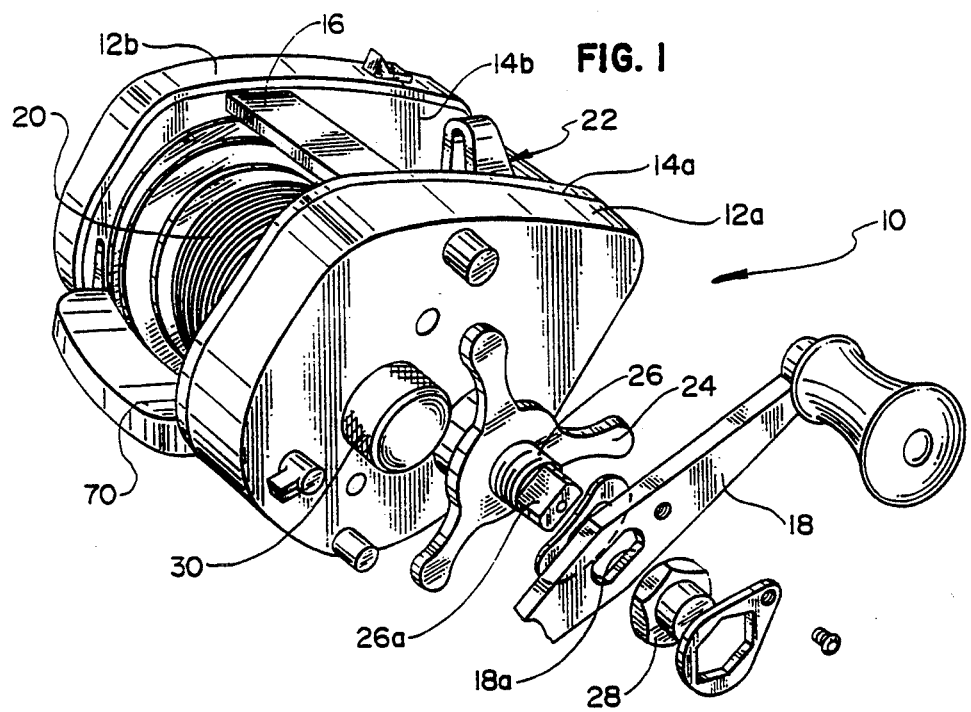
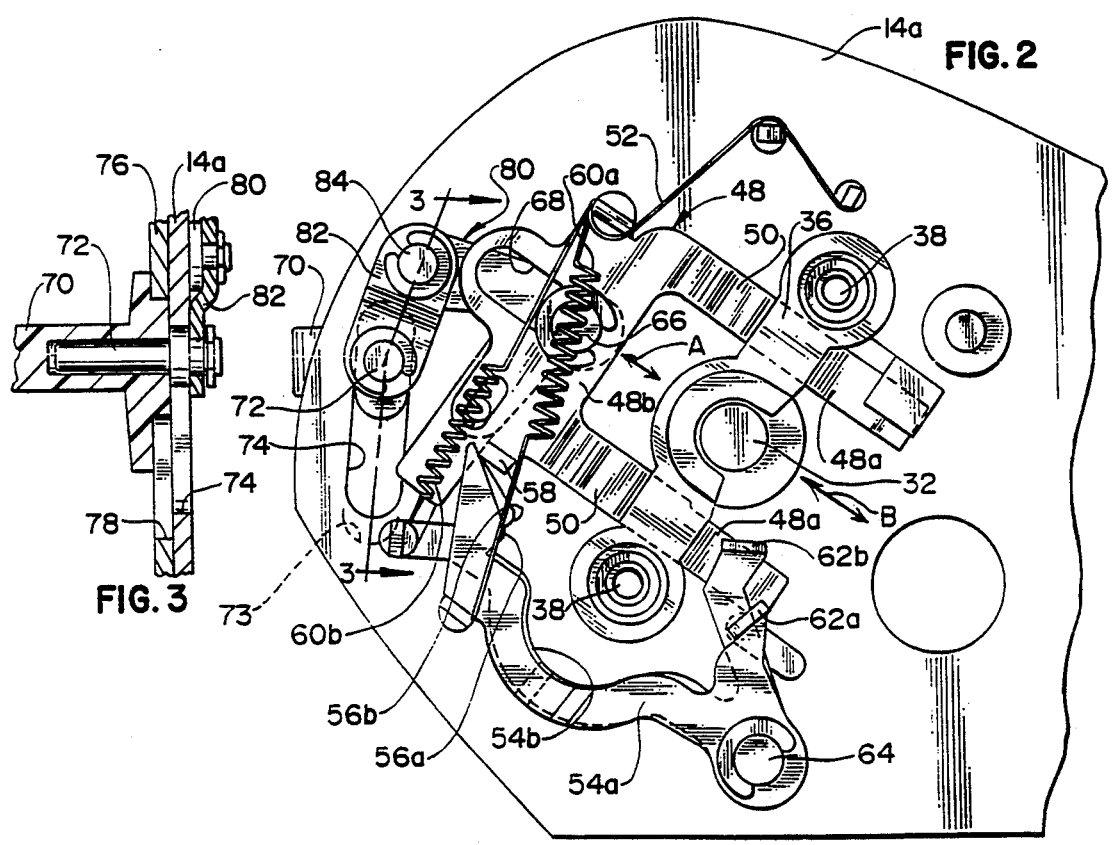

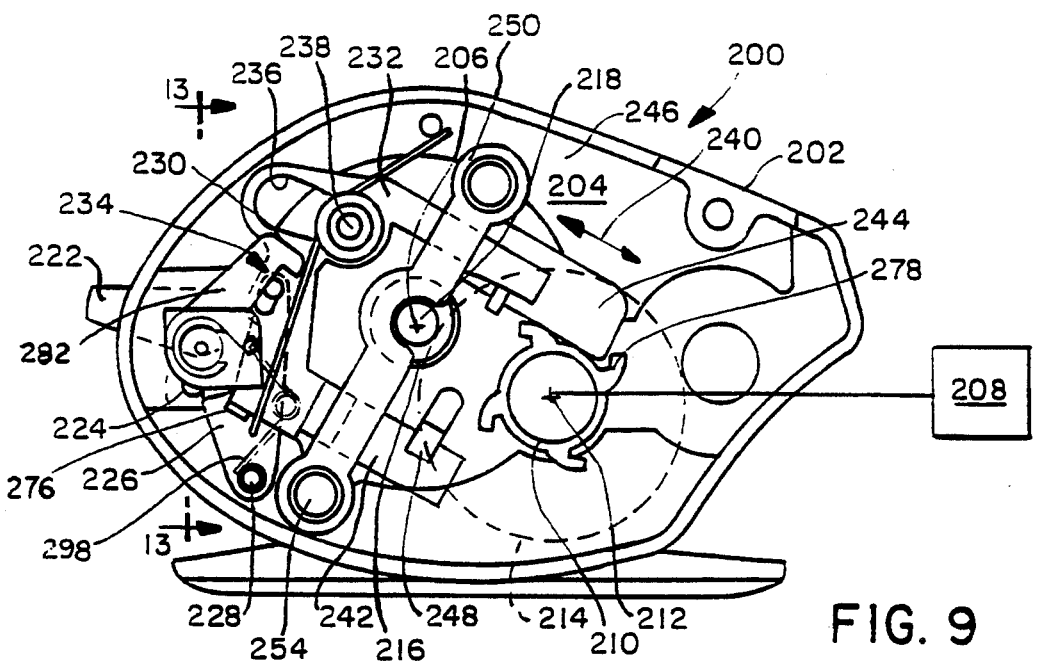
FIG. 9
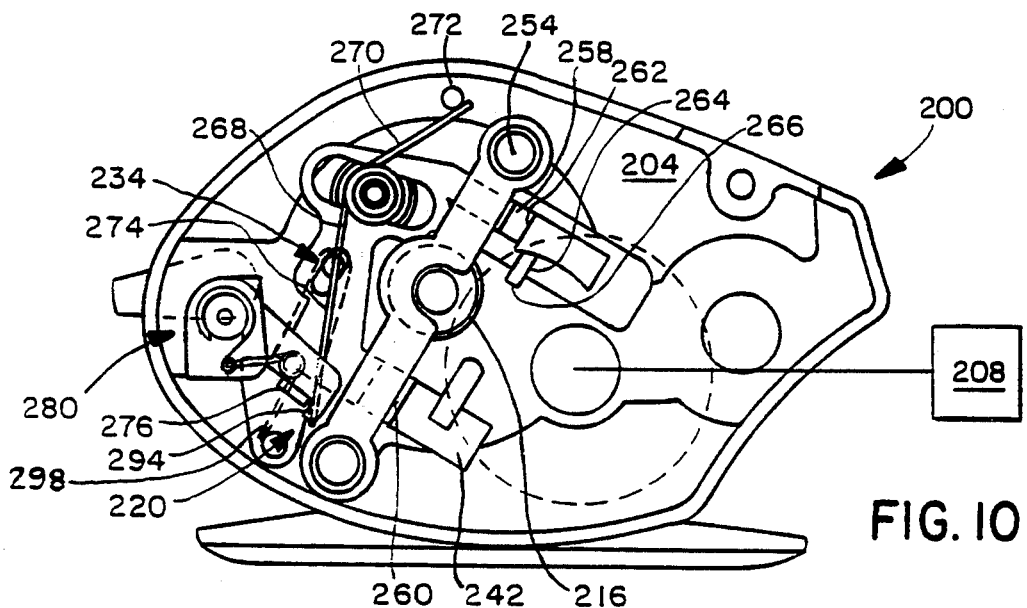
FIG. 10
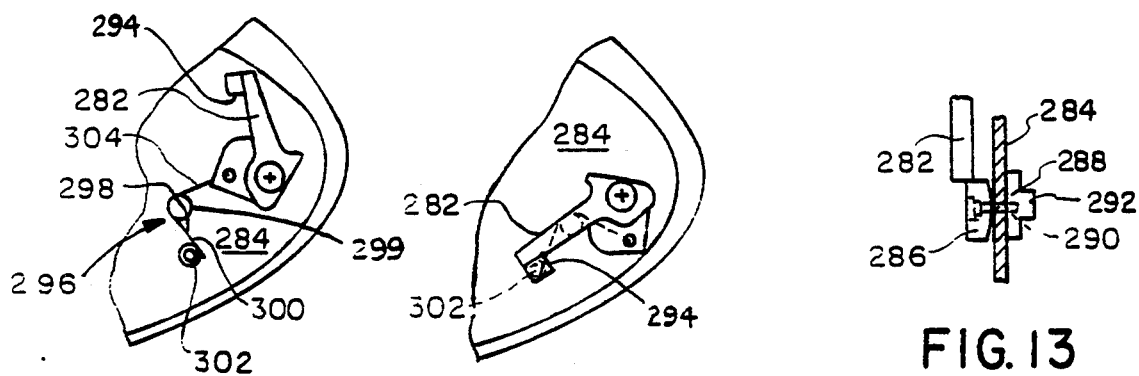
FIG. 11
FIG. 12
FIG. 13

MECHANISM TO INHIBIT LATCHING OF TRIP MECHANISM ON A BAIT CAST FISHING REEL

BACKGROUND OF THE INVENTION

1. Field of the Invention

This invention relates to fishing reels of the type having a mechanism, normally a movable thumb button, for selectively placing the reel in a cast mode and, more particularly, to a mechanism for selectively preventing the reel from latching in the cast mode, thereby obviating the user's having to operate a crank handle, or the like, to place the reel in the retrieve mode after the thumb button is released.

2. Background Art

Conventional bait cast fishing reels employ a rotatable, line-carrying spool which is operated through a crank handle. To effect a cast, a thumb button is depressed, which disengages the spool from the crank handle and allows the spool to freely rotate in a direction to allow line to pay out of the spool. In such conventional structures, full depression of the thumb button causes the reel to become latched in the cast mode. At the completion of the cast, the user operates the crank handle which results in the reel changing from the cast mode back to the retrieve mode.

The above-described conventional bait cast reel has a serious drawback. It requires that the user take the rod and reel in one hand, depress the thumb button with that hand, and effect a cast, after which the user switches the rod and reel to the opposite hand and effects rotation of the crank handle with the casting hand to arrest payout of line. Not only is this inconvenient, but there is a significant interval between the time that the cast is completed and the spool payout can be arrested. In shallow waters, this time lag may be sufficient for the bait to sink and become snagged.

SUMMARY OF THE INVENTION

The present invention is specifically directed to overcoming the above enumerated problem in a novel and simple manner.

The present invention is a fishing reel having a line-carrying spool, structure for directing line onto the spool, structure for selectively placing the fishing reel in cast and retrieve modes, line control structure for allowing the line to pay freely off of the spool with the reel in its cast mode and for preventing the line from freely paying off of the spool with the reel in its retrieve mode, structure for maintaining the fishing reel in its cast mode, and structure for selectively 1) preventing the maintaining structure from maintaining the fishing reel in the cast mode with the preventing structure in an "on" position and 2) allowing the maintaining structure to maintain the fishing reel in the cast mode with the preventing structure in an "off" position.

Preferably, the structure for selectively placing the fishing reel in the cast and retrieve modes includes a thumb button that is movable from a first position to a second position to effect change of the fishing reel from its retrieve mode to its cast mode. The preventing structure prevents the thumb button from being moved fully into its second position.

Preferably, the maintaining structure includes a latch element that moves between first and second positions in response to movement of the thumb button from its first towards its second position. The latch element engages the reel casing with the latch element in its second position to maintain the fishing reel in its cast mode. The preventing structure and latch element, with the preventing structure in its "on" position, cooperate to prevent the latch element from moving fully into its second position as the thumb button is moved from its first position towards its second position.

Resultingly, the reel cannot latch in the cast mode with the preventing structure "on". This allows the user to effect a cast with one arm. That is, the user depresses the thumb button and effects a cast in normal fashion while maintaining the thumb button depressed. The preventing structure prevents the latch element from latching to the casing. Consequently, upon release of the thumb button, bias structure urges the latch element back to its first position corresponding to the retrieve mode for the reel. The cast is completed and the return to the retrieve mode automatically effected without the user having to operate the crank handle.

With the preventing structure in the "off" position, the reel will operate normally. That is, the latch element will latch against the casing with the latch element in its second position. Rotation of the crank handle then unlatches the latch element to return the reel from the cast mode to the retrieve mode.

The preventing structure preferably includes a control knob for facilitating repositioning of the preventing structure selectively between its "on" and "off" positions. To facilitate operation externally of the reel by the user, the control knob has a control head situated externally of the reel casing. In a preferred form the knob is rotatable between its "on" and "off" positions.

To give the user a feel for the "on" and "off" positions and to assure that the control knob does in fact move fully into each of the "on" and "off" positions, an overcenter spring arrangement is provided. The spring drives the knob positively into each of the "on" and "off" positions therefor.

The present invention is useable with all styles of reels. It is, however, particularly adaptable to a bait cast-style fishing reel. In a preferred form, the reel housing/casing has a frame with laterally spaced side frame members with a side cover member associated with each side frame member. The spool is rotatably mounted about a laterally extending axis between the side frame members. The spool has an associated first gear that rotates therewith while a second gear is mounted in association with one of the side frame members for movement between a first position in mesh with the first gear and a second position wherein the first and second gears are in non-meshed relationship. The clutch plate is movable between first and second positions and, as an incident thereof, the second gear moves from its first position to its second position. The clutch plate has a latch leg for engagement with the housing with the clutch plate in its second position and the reel in the cast mode. The preventing structure prevents the clutch plate from moving fully into its second position.

In a preferred form the clutch plate has a leg that latches to the reel housing. The leg is normally biased towards a latched position. Upon rotation of the crank handle, the clutch plate leg is moved against the bias out of latched engagement.

In a preferred form, the clutch plate has an offset tab defining a shoulder and the preventing structure includes a movable control knob with a shoulder for engagement with the shoulder on the tab with the preventing structure in the "on" position as the clutch plate moves from its first towards its second position.

BRIEF DESCRIPTION OF THE DRAWINGS

FIG. 1 is a perspective view of a casting type fishing reel in accordance with the invention, with an exploded presentation of the components of the handle means;

FIG. 2 is an isolated elevational view, on an enlarged scale, illustrating the disengaged positions of the clutch means and the actuator means therefore;

FIG. 3 is fragmented section taken generally along line 3—3 of FIG. 2;

FIG. 9 is a side elevation view of a casting-type fishing reel having a side cover plate removed and with a structure according to the present invention for selectively preventing latching of the reel in a cast mode, the reel being shown in a retrieve mode with the latch preventing structure in its "off" position;

FIG. 10 is a view similar to that in FIG. 9 with the latch preventing structure in its "on" position and the reel in an unlatched cast mode;

FIG. 11 is a fragmentary side elevation view of a side cover plate taken from the side opposite that in FIG. 9 and showing the inventive latch preventing structure in its "off" position;

FIG. 12 is a view similar to that in FIG. 11 with the latch preventing structure in its "on" position; and FIG. 13 is a cross-sectional view of the latch preventing structure taken alone line 13—13 of FIG. 9.

DETAILED DESCRIPTION OF THE DRAWINGS

Figure 4:
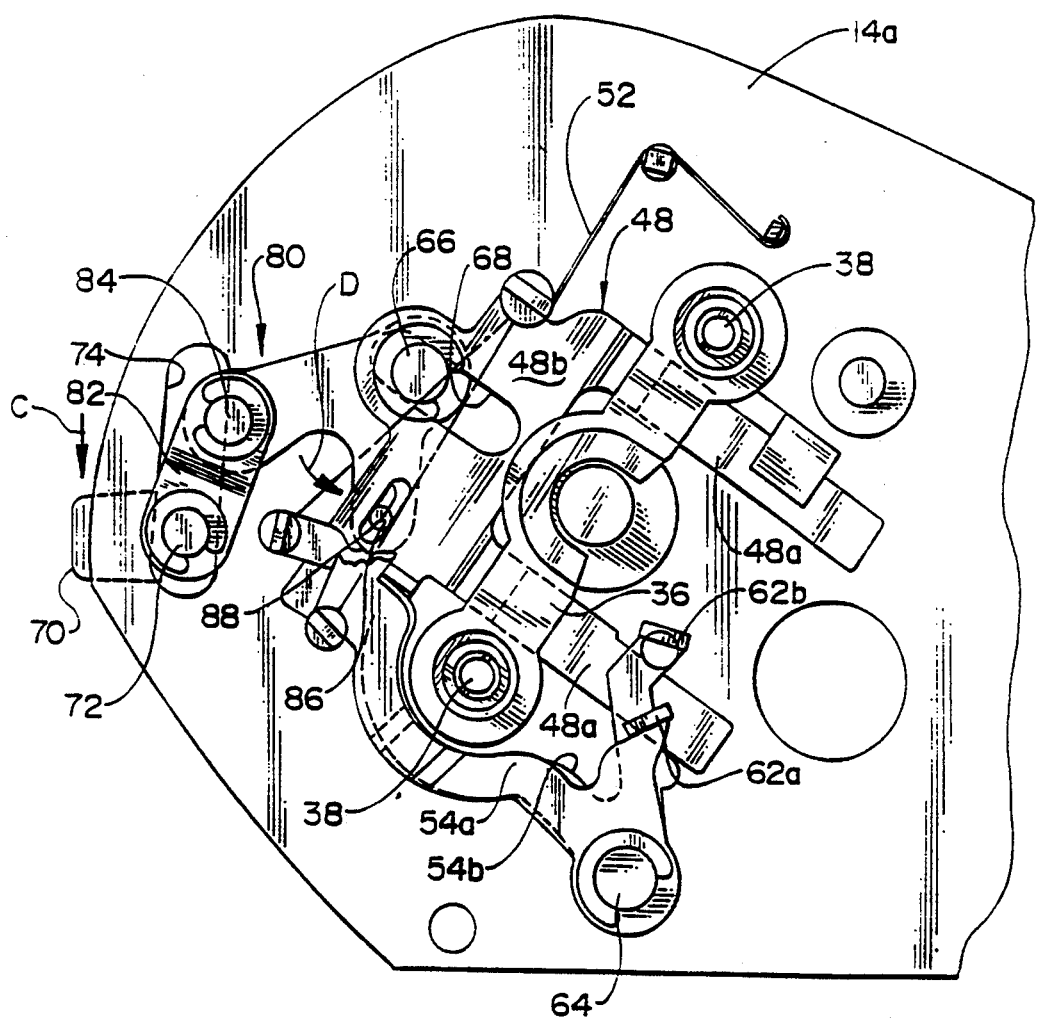
FIG. 4 is a view similar to that of FIG. 2, with the clutch mechanism and actuator means in engaged positions.
Figure 5:
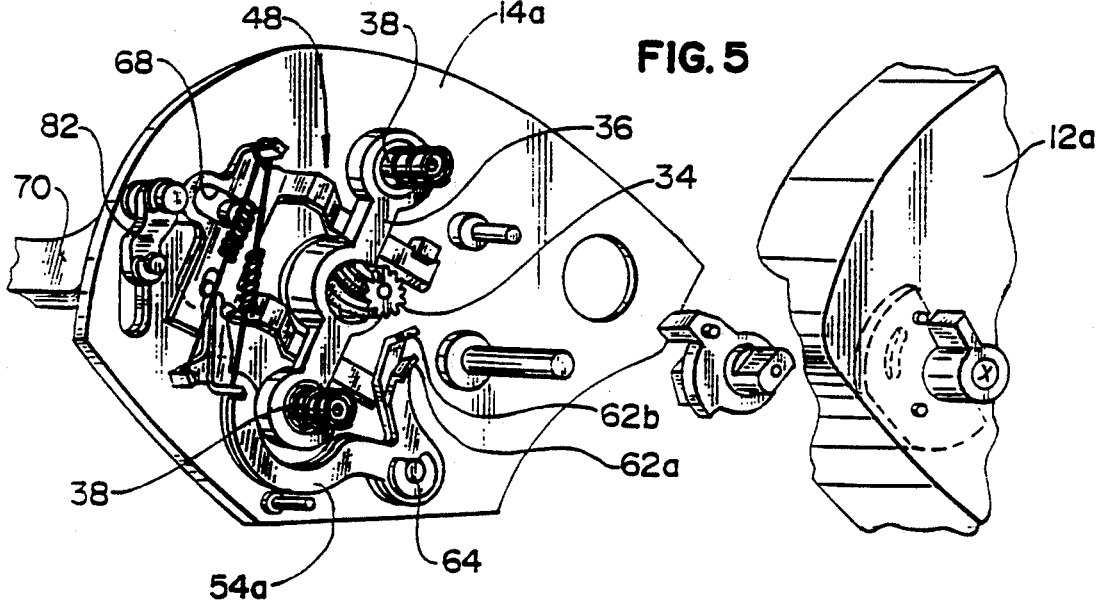
FIG. 5 is a perspective view of the clutch mechanism and actuator means in disengaged positions.
Figure 6:
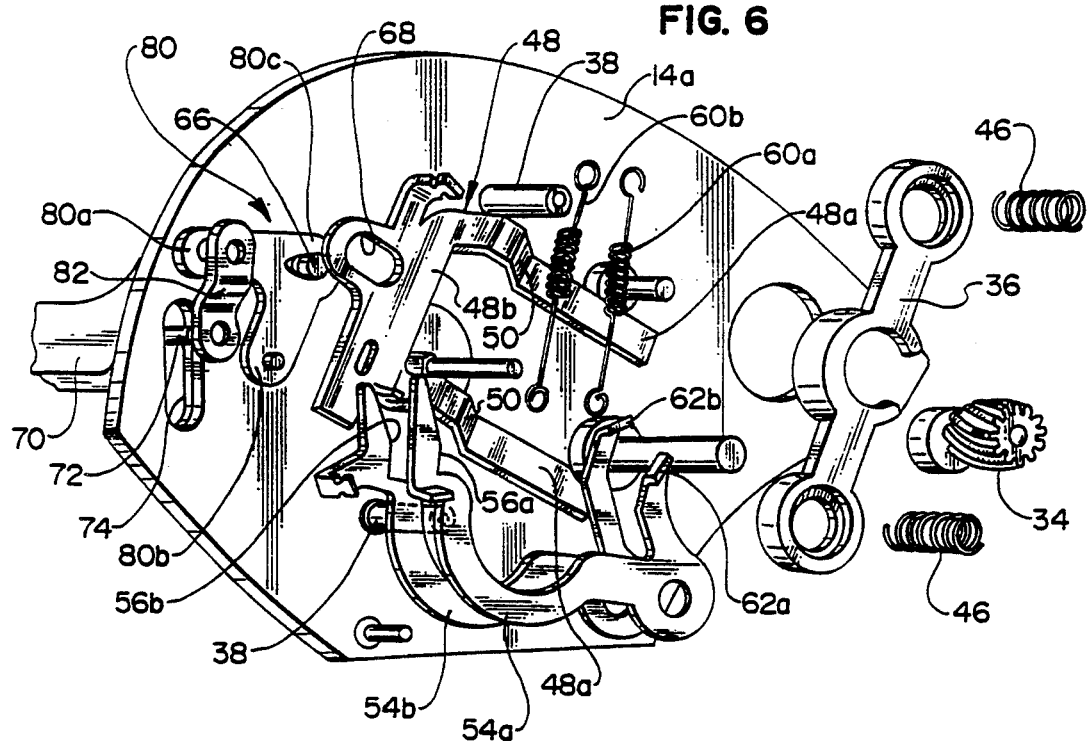
FIG. 6 is an exploded perspective view, on an enlarged scale, of the clutch mechanism and actuator means.

Referring to the drawings in greater detail, and first to FIG. 1, a casting type fishing reel is shown and generally designated 10. The reel includes a housing defined by a pair of side cover members 12a and 12b. The housing includes a pair of side frame members 14a and 14b with a plurality of spacer posts 16 (only one of which is visible in the FIG.) extending transversely therebetween. A handle 18 is rotatably mounted on the outside of cover 12a for rotating a spool 20 to retrieve fishing line, as is conventional. A level wind mechanism, generally designated 22, is provided for traversing spool 20 during winding the fishing line thereon. A conventional star wheel 24 is threaded onto a crank shaft 26, the star wheel being operatively associated with a drag mechanism of the reel. Handle 18 includes a rectangular hole 18a which is shaped complementary to a rectangularly shaped distal end 26a of crank shaft 26 for rotating the crank shaft and, therefore, the spool 26 and other operative components of the reel. The distal end of the crank shaft is externally threaded for receiving a nut 28 for securing the handle to the distal end of the crank shaft. A cup-shaped hub bearing cap 30 is shown exteriorly of side cover 12a and positioned as described below.

Figure 7:
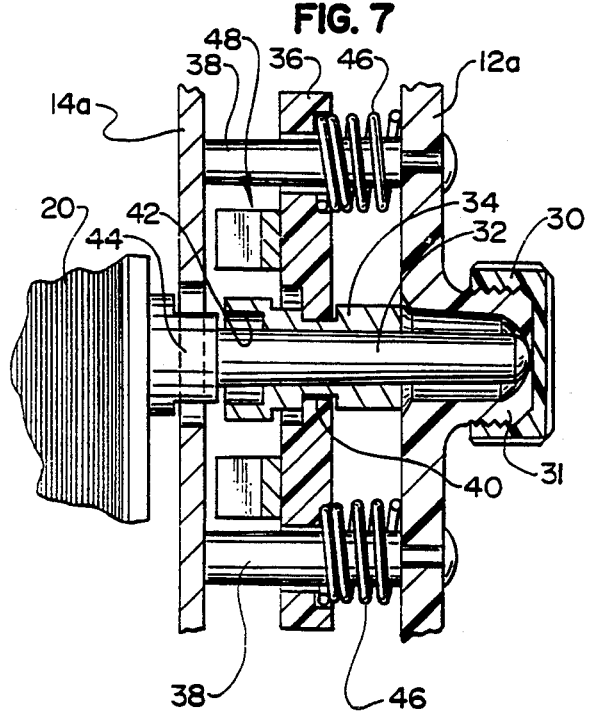
FIG. 7 is a fragmented section, on an enlarged scale, depicting the disengaged position of the pinion gear and the associated components of the clutch mechanism.
Figure 8:
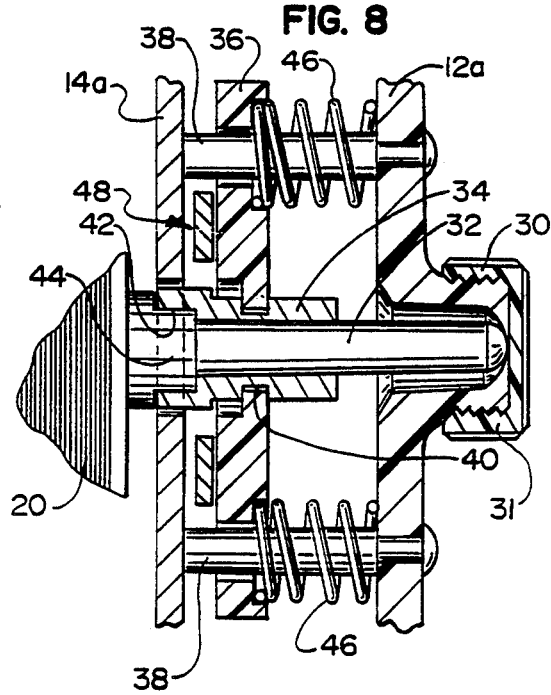
FIG. 8 is a view similar to that of FIG. 7 with the pinion gear and clutch components in engaged positions.
Figure 14:
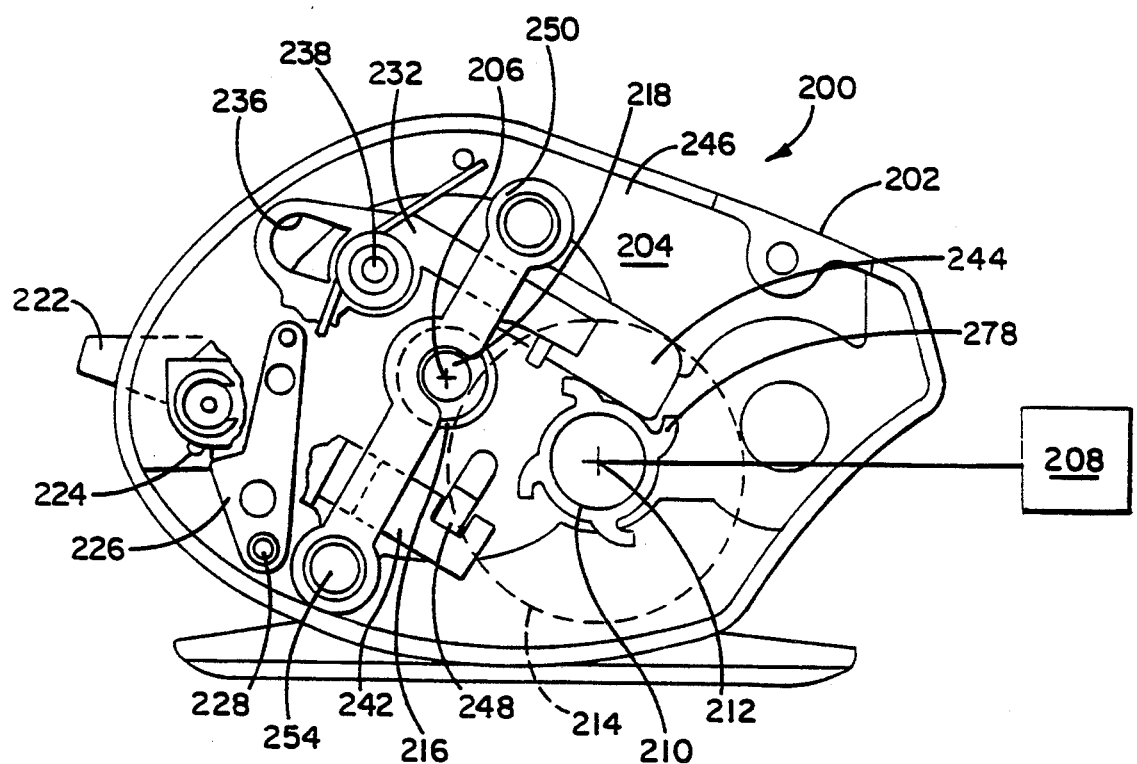
FIG. 14 is a side elevation of the fishing reel having a side cover plate removed and some elements removed or partially cut away to reveal underlying structures.

FIGS. 7 and 8 show hub bearing cap 30 threaded onto a boss 31 of cover 12a for receiving and providing a pilot for a spool shaft 32 of spool 20. Generally, clutch means are provided for selective actuation to disengage a spool pinion gear 34 from spool shaft 32 to permit the spool to free-wheel during casting, and to automatically reengage the pinion gear with the spool shaft immediately in response to initial rotation of handle 18 to retrieve the fishing line. More particularly, a carrier plate 36 is mounted on a pair of posts 38 formed integrally with or projecting axially from side plate 14a, whereby the carrier plate is movable generally parallel to spool shaft 32. Carrier plate 36 seats within an annular recess 40 in pinion gear 34 for axially moving the gear with the carrier plate.

FIG. 7 shows pinion gear 34 in its disengaged position and FIG. 8 shows the pinion gear in its axial position of engagement with the spool. To this end, pinion gear 34 has an irregularly shaped socket 42 which meets with a complementarily irregularly shaped enlarged portion 44 of spool shaft 32 to drive the spool shaft. When in disengaged position, spool 20 is free to rotate for casting purposes. A pair of coil springs 46 are sandwiched between carrier plate 36 and right-hand cover 12a to bias the carrier plate and pinion gear 34 automatically back to the position of engagement of the pinion gear. The structure and function of pinion gear 34, carrier plate 36, etc., generally are known in the art. The carrier plate and pinion gear are movable axially of spool shaft 32 by a clutch plate, generally designated 48.

Referring back to FIGS. 2-6 details of the clutch means and actuator means now will be described. With the description of FIGS. 7 and 8, the position of pinion gear 34 and carrier plate 36 in relation to the clutch mechanism are illustrated and their function and operation now can be better understood. In addition, the positions of the components of the clutch means with the pinion gear in engaged condition are shown in FIGS. 2, 3, 5 and 6. The position of the components of the clutch mechanism with the pinion gear and carrier plate in disengaged or free casting condition are shown in FIG. 4.

More particularly, clutch plate 48 is generally U-shaped and is slidably mounted on frame plate 14a for generally linear movement perpendicular to spool shaft 32 in the direction of double-headed arrow "A" (FIG. 2). The U-shaped clutch plate has a pair of legs 48a joined by a cross or bight portion 48b. The legs underlie carrier plate 36. Each leg of the clutch plate has an inclined cam ramp portion 50 which, upon movement in the direction of arrow "B" (FIG. 2) are effective to "lift" the carrier plate and disengage the pinion gear from the spool shaft as described in relation to FIGS. 7 and 8. In other words, when clutch plate 48 is moved from the position shown in FIG. 2 to the position shown in FIG. 4, the spool is conditioned for free rotation for casting purposes.

A spring 52 (FIGS. 2 and 4) normally biases clutch plate 48 toward its disengaged condition. Upper and lower latch devices 54a and 54b, respectively, have shoulders 56a and 56b, respectively, which seat behind a latch post 58 projecting from clutch plate 48. These latch devices are biased by springs 60a and 60b, respectively, toward latching condition such that shoulders 56a 56b are held behind latch post 58 until released. After a cast by a fisherman, upon initial rotation of handle 18 and crankshaft 26, ratchet means not shown on the crankshaft will engage release tongues 62a and 62b, of latch devices 54a and 54b, respectively, to pivot the latch devices about pivot pin 64 and move shoulders 56a,56b from out of engagement with latch post 58 of clutch plate 48. Thereupon, spring 52 will move the clutch plate back opposite the direction of arrow "B". Linear movement of the clutch plate is guided by a post 66 projecting from frame plate 14a and into an elongated slot 68 in the clutch plate, the elongated slot extending generally in the direction of linear movement of the clutch plate (i.e. arrows "A" and "B"). The general operation of such a U-shaped clutch plate is known.

Actuator means, including a thumb button or bar 70 exposed exteriorly of the reel, are provided for effecting linear movement of clutch plate 48. The actuator means itself is mounted on the reel housing for generally linear movement oblique to the linear movement of the clutch plate.

More particularly, as seen in FIG. 3, thumb bar 70 has a pin 72 which extends through an elongated slot 74 in side frame plate 14a. Actually, as shown in FIG. 3, side frame plate 14a is covered by an inner covering plate 76 also having an elongated slot 78 through which pin 72 extends. As shown in FIGS. 2 and 4, slot 74 (and slot 76) define a linear path of travel for thumb bar 70 as indicated by arrow "C" (FIG. 4). This linear path of travel is oblique to that of clutch plate 48 as indicated by arrows "A" and "B" in FIG. 2. Movement of the thumb bar is effected simply by a fisherman pushing down on the bar with his thumb in the direction of arrow "C". Contrary to prior arcuately moveable thumb buttons or bars, or bars which are pivotally mounted, this linear movement gives considerable ease of operation.

Generally, motion transmitting means are provided operatively associated between the actuator means, including thumb bar 70, and the clutch means, including clutch plate 48, for linearly moving the clutch plate and the pinion gear 34 in response to linear movement of the actuator means. More particularly, cam lever means in the form of a bell crank, generally designated 80, is connected by lost motion means between the actuator means and the clutch means. The configuration of bell crank 80 can best be seen in FIG. 4 and the perspective view of FIG. 6. The bell crank includes first and second legs 80a and 80b, respectively, meeting at a juncture 80c. The bell crank is pivoted on post 66 which projects through elongated slot 68 in clutch plate 48. Leg 80a is operatively associated with the actuator means and leg 80b is operatively associated with the clutch means.

Specifically, the lost motion means between leg 80a of bell crank 80 and thumb bar 70 comprises a link arm 82 pivotally connected at one end to pin 72 and pivotally connected at its opposite end to the distal end of leg 80a by a pin 84.

The lost motion means between bell crank 80 and clutch plate 48 comprises a pin-and-slot construction including a pin 86 projecting from the distal end of leg 80b of the bell crank into a lost motion, elongated slot 88 in bight portion 48b of clutch plate 48.

With the above-described structure, it can be understood that when a fisherman desires to effect free rotation of spool 20 for casting, he depresses thumb bar 70 in the direction of arrow "C" (FIG. 4). This causes the actuator means and clutch means to move from the condition of the components shown in FIG. 2 (as well as FIGS. 5 and 6) to the condition of the components shown in FIG. 4. Specifically, rotation of bell crank 80 in the direction of arrow "D", through the above-described lost motion means, is effective to convert linear movement of the thumb bar to the oblique linear movement of clutch plate 48. In essence, the ease and operation of linearly movable parts is afforded, while the motion transmitting means in the form of bell crank 80 provides a mechanical advantage for efficiently transmitting forces from the thumb bar to the clutch plate.

BEST MODE FOR CARRYING OUT THE INVENTION

A modified form of bait cast reel, according to the present invention, is shown at 200 in FIGS. 9-13. The bait cast reel 200 operates in a fashion similar to that embodiment earlier described with respect to FIGS. 1-8. As in the prior embodiment, the reel 200 has a housing 202 with side frame members 204 (one shown) between which a line carrying spool (not shown) is mounted for rotation about a laterally extending axis 206. The means for rotating the spool to effect line retrieval is indicated schematically at 208 and normally consists of a rotatable crank handle which drives a shaft 210 about a laterally extending axis 212. The shaft 210 carries a gear 214 which, with the reel 200 in its retrieve mode of FIG. 9, is in mesh with a gear 216 on the spool shaft 218.

The present invention is concerned with spool control means, indicated generally at 220, for selectively disengaging the spool from the spool rotating means 208 and for allowing the spool to rotate freely in a direction to allow line to pay out of the spool with the fishing reel in a cast mode. The spool control means 220 is operated by a thumb button 222 which is pivotable between first and second positions about a laterally extending axis in a counterclockwise direction in FIGS. 9 and 10 to effect change of the reel from its retrieve mode to its cast mode. Depression of the thumb button 222 causes a laterally extending pin 224 thereon to bear against a link arm 226 to pivot the link arm 226 about a pin 228. This pivots the arm end 230 remote from the pin 228 in a clockwise direction in FIGS. 9 and 10, which in turn effects substantially translatory movement of a sliding clutch plate/latching element 232 from a first position, shown in FIG. 9, towards a second position in which the clutch plate/latching element 232 is shifted towards the right from the FIG. 9 position. This transfer movement is effected through a pin and slot connection at 234.

The clutch plate/latching element 232 has an elongate slot 236 to accept a pin 238 on the housing 202 so that the clutch plate/latching element 232 is guided in a substantially linear path, indicated by the double-headed arrow 240, between its first and second positions. Laterally inwardly facing surfaces (not shown) on spaced legs 242, 244 associated with clutch plate/latching element 232, facially abut and are guided against the laterally outwardly facing surface 246 on the side frame member 204. A boss 248 on the side frame member 204 maintains the leg 242 in intimate contact with the frame surface 246 in operation.

As in the prior embodiment, a carrier plate 250 is mounted on the side frame member 204, with lateral movement thereof being guided by spaced posts 254. In the retrieve mode for the reel 200, shown in FIG. 9, the gear 216 is meshed with the gear 214 rotated by the crank handle 208 so that the axes of the gears 214,216 are parallel. Depression of the thumb button 222 from its first position in FIG. 9 causes the clutch plate/latching element 232 to shift to the right from the FIG. 9 position, thereby causing ramp surfaces 258, 260 on the clutch plate/latching element 232 to progressively bias the carrier plate 250 laterally outwardly. The carrier plate 250 shifts the gear 216 to its second position out of mesh with the gear 214 so that the spool is free to rotate to allow the payout of line. With the clutch plate/latching member 232 shifted fully to the right to its second position, a latching shoulder 262 thereon moves past an oppositely facing shoulder 264 on a boss 266 on the side frame member 204. As this occurs, the clutch plate/latching element 232 is biasably canted slightly in a counterclockwise direction about the pin 238 to place the shoulders 262, 264 in abutting relationship so as to prohibit shifting of the clutch plate/latching element 232 back to its first position. The shoulders thereby define means for maintaining the reel in its cast mode. This counterclockwise shifting is effected by a wire spring 268 coiled about the pin 238. The spring 268 has one leg 270 loaded against a post 272 on the side frame member 204 and an opposite leg 274 bearing on a tab 276 projecting laterally outwardly from the clutch plate/latching element 232.

To change the reel from the cast mode to the retrieve mode, the shaft 210 is operated through the crank handle 208 in a clockwise direction to rotate a trip gear 278 to deflect the clutch plate/latching element 232 slightly upwardly and in a counterclockwise direction to allow the spring leg 268 to drive the carrier plate 250 back into its first position and thereby place the reel in its retrieve mode.

The present invention is directed to a means at 280 for selectively preventing the clutch plate/latching element 232 from latching in its second position. To accomplish this, an arm 282 is pivotably mounted on the cover plate 284 which is secured on the side frame member 204. The arm 282 is carried on a knob 286 which is operatively joined to a control head 288 at the outside of the fishing reel. A screw 290 extends from inside out through the knob 286, the cover plate 284 and into the control head 288 to hold the parts in assembled relationship. The control head 288 has a rib 292 to facilitate its being gripped by a user and turned together with the associated arm 282.

With the arm 282 in the "off" position of FIG. 9, the spool control means 220 operates as previously described. However, with the arm 282 moved to its "on" position of FIG. 11, which is accomplished by rotating the knob 286 through the control head 288 in a clockwise direction, a shoulder 294 on the arm 282 is placed in the path of the tab 276 on the clutch plate/latching element 232 as the clutch plate/latching element 232 moves between its first and second positions. The shoulder 294 abuts the tab 276 before the clutch plate/latching element 232 realizes its second position and before the shoulders 262, 264 can latch. However, the clutch plate/latching element 232 movement is sufficient to disengage the gear 216 from the gear 256 so that the line can be cast by the user. The line can be cast and paid out by the user so long as the thumb button 222 remains depressed. Upon release of the thumb button 222, the spring leg 274 drives the clutch plate/latching element 232 back towards its first position and through the pin and slot connection at 234 pivots the link arm 226 and in turn the thumb button 222 back to their first positions. The reel 200 then automatically assumes the retrieve position without the user having to operate the crank handle 208.

To allow the user to sense the "on" and "off" positions for the preventing means 280, an overcenter spring arrangement is provided at 296. The overcenter spring 296 consists of a formed wire 298 having a center coil 299, a first arm 300 anchored to a post 302 on the cover plate 284 and a second arm 304 pivotably engaging the knob 286. It can be seen in FIGS. 11 and 12 that the loaded arm 304 drives the knob 286 positively into each of the "on" and "off" positions therefor. The overcenter arrangement also gives the user a feel when the "on" and "off" positions are achieved.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A fishing reel comprising:
   a rotatable line-carrying spool;
   means for rotating the spool to direct line thereon with the fishing reel in a retrieve mode;
   spool control means for disengaging the spool from the spool rotating means and for allowing the spool to rotate freely in a direction to allow line to pay out of the spool with the fishing reel in a cast mode,
   said spool control means including means for maintaining the fishing reel in the cast mode,
   said spool control means further including a movable clutch plate/latching element having a tab thereon and means acting against the tab for biasing the clutch plate/latching element to a first position whereby the maintaining means maintains the fishing reel in the cast mode with the clutch plate/latching element in said first position;
   means on the spool rotating means and means on the spool control means cooperating with each other for changing the fishing reel from the cast mode to the retrieve mode in response to the spool rotating means being operated so as to rotate the spool to direct line thereon; and
   means for selectively 1) preventing the maintaining means from maintaining the fishing reel in the cast mode with the preventing means sin an "on" position and 2) allowing the maintaining means to maintain the fishing reel in the cast mode with the preventing means in an "off" position,
   said preventing means including an arm that is movable to engage the clutch plate/latching element tab with the preventing means in an "on" position to prevent the clutch plate/latching element from realizing the position wherein the maintaining means maintains the fishing reel in a cast mode.

2. The fishing reel according to claim 1 wherein the spool rotating means comprises a rotatable crank handle.

3. The fishing reel according to claim 1 wherein the fishing reel has a housing, said spool control means including means for moving the clutch plate/latching element between a first position and a second position in response to the fishing reel being changed from the retrieve mode to the cast mode, said maintaining means comprising means on the clutch plate/latching element and means son the housing cooperating with each other for maintaining the clutch plate/latching element in its second position, and the preventing means in it "on" position resides in the path of the clutch plate/latching element moving from its first position towards its second position and is positioned to prevent the clutch plate/latching element from moving fully into its second position.

4. The fishing reel according to claim 3 wherein means are provided for biasing the clutch plate/latching element towards its first position with the clutch plate/latching element residing between its first and second positions.

5. The fishing reel according to claim 1 wherein the preventing means includes a control knob for facilitating repositioning of the preventing means selectively between its "on" and "off" positions.

6. The fishing reel according to claim 1 wherein the preventing means includes a control knob with a control head situated externally of the housing for facilitating repositioning of the preventing means selectively between its "on" and "off" positions.

7. The fishing reel according to claim 6 wherein the control knob is rotatable between its "on" and "off" positions.

8. The fishing reel according to claim 6 wherein means are provided for biasing the control knob into each of its "on" and "off" positions.

9. The fishing reel according to claim 8 wherein the biasing means comprises an over center spring arrangement.

10. A casting style fishing reel comprising:
a housing including a frame with laterally spaced side frame members with a side cover member associated with each side frame member;
a line-carrying spool rotatably mounted for rotation about a laterally extending axis between the side frame members;
means for rotating the spool to direct line thereon with the reel in a retrieve mode;
spool control means for disengaging the spool from the spool rotating means for allowing the spool to freely rotate in a direction to allow line to pay out of the spool with the reel in a cast mode;
means for maintaining the fishing reel in the cast mode;
means on the spool rotating means and means on the spool control means cooperating with each other for changing the fishing reel from the cast mode to the retrieve mode as an incident of the spool rotating means being operated; and
means for selectively 1) preventing the maintaining means from maintaining the fishing reel in the cast mode with the preventing means in an "on" position and 2) allowing the maintaining means to maintain the fishing reel in the cast mode with the preventing means in an "off" position,
wherein there is a first gear that rotates with the spool, the spool rotating means includes a second gear movably mounted between a first position in mesh with the first gear and a second position wherein the first and second gears are in non-meshed relationship, there is a rotatable crank handle for rotating the second gear, the spool control means includes a clutch plate/latching member that is movable between a first position and a second position, there being means responsive to movement of the clutch plate/latching element from its first position to its second position for moving the second gear from its first position to its second position, said maintaining means including a latch leg for engagement with the housing with the clutch plate in its second position and the reel in the cast mode and the preventing means in its "off" position and the preventing means prevents the clutch plate from moving fully into its second position with the preventing means in its "on" position, said preventing means including a tab on said spool control means projecting in the line of the spool axis and a movable arm on the housing that engages the tab with the preventing means in its "on" position to prevent the clutch plate/latching member from realizing its second position.

11. The casting-style fishing reel according to claim 10 including means for biasably holding the latch leg on the clutch plate engaged with the housing with the clutch plate in its second position.

12. The casting-style fishing reel according to claim 10 wherein the spool control means includes means for deflecting the clutch plate out of latched engagement with the housing upon the spool rotating means being operated with the reel in the cast mode.

13. The casting-style fishing reel according to claim 10 wherein the preventing means includes a rotatable control knob with a control head situated externally of the reel housing.

* * * * *